United States Patent
Roach et al.

(10) Patent No.: US 11,960,457 B2
(45) Date of Patent: Apr. 16, 2024

(54) USE OF GRAPH DATABASES FOR REPLICATING TOPOLOGY AND ENRICHING MONITORING DATA STREAMS IN COMPLEX INFORMATION TECHNOLOGY SYSTEMS

(71) Applicant: BMC Software, Inc., Houston, TX (US)

(72) Inventors: Robert Clayton Roach, Seattle, WA (US); Robert Joseph McKeown, Newburyport, MA (US); David Joel Pennell, Sr., Dunbarton, NH (US)

(73) Assignee: BMC Software, Inc., Houston, TX (US)

( * ) Notice: Subject to any disclaimer, the term of this patent is extended or adjusted under 35 U.S.C. 154(b) by 50 days.

(21) Appl. No.: 17/655,330

(22) Filed: Mar. 17, 2022

(65) Prior Publication Data

US 2022/0318210 A1    Oct. 6, 2022

Related U.S. Application Data

(60) Provisional application No. 63/170,574, filed on Apr. 5, 2021.

(51) Int. Cl.
*G06F 16/21* (2019.01)
*G06F 16/26* (2019.01)
*G06F 16/901* (2019.01)

(52) U.S. Cl.
CPC ............ *G06F 16/212* (2019.01); *G06F 16/26* (2019.01); *G06F 16/9024* (2019.01)

(58) Field of Classification Search
CPC .................................................... G06F 16/211
See application file for complete search history.

(56) References Cited

U.S. PATENT DOCUMENTS

| | | | | |
|---|---|---|---|---|
| 2017/0221240 | A1* | 8/2017 | Stetson | G06T 11/206 |
| 2017/0364534 | A1* | 12/2017 | Zhang | G06F 16/284 |
| 2018/0032603 | A1* | 2/2018 | Vaquero Gonzalez | G06F 16/25 |
| 2019/0312869 | A1* | 10/2019 | Han | G06F 21/64 |

* cited by examiner

*Primary Examiner* — Dawaune A Conyers
(74) *Attorney, Agent, or Firm* — Brake Hughes Bellermann LLP

(57) ABSTRACT

The systems and techniques include storing topology from each of a plurality of source tools as a plurality of source subgraphs in a graph database using a source schema that mirrors a source topology model for each of the plurality of source tools. Each of the plurality of source subgraphs in the graph database is transformed to a plurality of destination subgraphs using a destination schema and transformation rules that mirror a destination topology model for each of a plurality of destination tools. The plurality of destination subgraphs are stored in the graph database. The topology is delivered to each of the plurality of destination tools by traversing the plurality of destination subgraphs in the graph database and invoking application programming interfaces (APIs) for each of the plurality of destination tools in the destination subgraphs in the graph database.

21 Claims, 12 Drawing Sheets

USE OF GRAPH DATABASES FOR REPLICATING TOPOLOGY AND ENRICHING MONITORING DATA STREAMS IN COMPLEX INFORMATION TECHNOLOGY SYSTEMS

CROSS-REFERENCE TO RELATED APPLICATION

This application claims priority to and the benefit of U.S. Provisional Application Ser. No. 63/170,574, filed Apr. 5, 2021, titled "Use of Graph Databases For Replicating Topology And Enriching Monitoring Data Streams In Complex Information Technology Systems," which is incorporated herein by reference in its entirety.

TECHNICAL FIELD

This description relates to the use of graph databases for replicating topology and enriching monitoring data streams in complex information technology (IT) systems.

BACKGROUND

Many enterprise organizations use, operate, and/or maintain very complex IT systems. For example, FIG. 1 illustrates such a complex IT system 100. The system 100 may include components such as, for instance, applications 102 (or apps for short), web services 104, databases 106, operating system (OS)/virtual machine (VM) containers 108, servers 110, and networks 112. The system 100 and its components may be implemented in different environments including private cloud 114, hybrid cloud 116, public cloud 118, and/or on-premise 120. The system 100 illustrates a variety of these different components 102-112 as domain-specific applications and services 122. The system 100, and other organizations with similarly complex IT systems, may have ten or more monitoring tools that each have a different view into the system 100 and components 102-112 being monitored. With such complexity in IT systems and the associated monitoring tools, getting an overall view across all the data gathered by the tools can be difficult.

SUMMARY

In one general aspect, the techniques described herein relate to a computer-implemented method, the computer-implemented method to connect information technology (IT) tools to provide a unified view of an IT system, the computer-implemented method including: storing topology from each of a plurality of source tools as a plurality of source subgraphs in a graph database using a source schema that mirrors a source topology model for each of the plurality of source tools; transforming each of the plurality of source subgraphs in the graph database to a plurality of destination subgraphs using a destination schema and transformation rules that mirror a destination topology model for each of a plurality of destination tools; storing the plurality of destination subgraphs in the graph database; and delivering the topology to each of the plurality of destination tools by traversing the plurality of destination subgraphs in the graph database and invoking application programming interfaces (APIs) for each of the plurality of destination tools in the destination subgraphs in the graph database.

In some aspects, the techniques described herein relate to a computer-implemented method, where transforming each of the plurality of source subgraphs includes using graph queries to traverse each of the plurality of source subgraphs in a pattern consistent with a structure of each of the plurality of destination subgraphs.

In some aspects, the techniques described herein relate to a computer-implemented method, further including exposing the transformation rules to enable modification of the transformation rules via a user interface (UI).

In some aspects, the techniques described herein relate to a computer-implemented method, where the transformation rules include separate transformation rules defined for a combination of each of the plurality of source subgraphs being transformed to each of the plurality of destination subgraphs.

In some aspects, the techniques described herein relate to a computer-implemented method, further including generating and outputting a graph visualization of the topology for each of the plurality of destination tools.

In some aspects, the techniques described herein relate to a computer-implemented method, further including generating edges between each of the plurality of source subgraphs and each of the plurality of destination subgraphs.

In some aspects, the techniques described herein relate to a computer-implemented method, further including generating and outputting a separate graph visualization for each of the plurality of source subgraphs transformed to each of the plurality of destination subgraphs including the edges between each of the plurality of source subgraphs and each of the plurality of destination subgraphs.

In some aspects, the techniques described herein relate to a computer-implemented method, further including collecting the topology from the plurality of source tools.

In one general aspect, the techniques described herein relate to a computer program product to connect information technology (IT) tools to provide a unified view of an IT system, the computer program product being tangibly embodied on a non-transitory computer-readable medium and including executable code that, when executed, is configured to cause a computing device to: store topology from each of a plurality of source tools as a plurality of source subgraphs in a graph database using a source schema that mirrors a source topology model for each of the plurality of source tools; transform each of the plurality of source subgraphs in the graph database to a plurality of destination subgraphs using a destination schema and transformation rules that mirror a destination topology model for each of a plurality of destination tools; store the plurality of destination subgraphs in the graph database; and deliver the topology to each of the plurality of destination tools by traversing the plurality of destination subgraphs in the graph database and invoking application programming interfaces (APIs) for each of the plurality of destination tools in the destination subgraphs in the graph database.

In some aspects, the techniques described herein relate to a computer program product, where the executable code that, when executed, causes the computing device to use graph queries to traverse each of the plurality of source subgraphs in a pattern consistent with a structure of each of the plurality of destination subgraphs.

In some aspects, the techniques described herein relate to a computer program product, further including executable code that, when executed, causes the computing device to expose the transformation rules to enable modification of the transformation rules via a user interface (UI).

In some aspects, the techniques described herein relate to a computer program product, where the transformation rules include separate transformation rules defined for a combination of each of the plurality of source subgraphs being transformed to each of the plurality of destination subgraphs.

In some aspects, the techniques described herein relate to a computer program product, further including executable code that, when executed, causes the computing device to generate and output a graph visualization of the topology for each of the plurality of destination tools.

In some aspects, the techniques described herein relate to a computer program product, further including executable code that, when executed, causes the computing device to generate edges between each of the plurality of source subgraphs and each of the plurality of destination subgraphs.

In some aspects, the techniques described herein relate to a computer program product, further including executable code that, when executed, causes the computing device to generate and output a separate graph visualization for each of the plurality of source subgraphs transformed to each of the plurality of destination subgraphs including the edges between each of the plurality of source subgraphs and each of the plurality of destination subgraphs.

In some aspects, the techniques described herein relate to a computer program product, further including executable code that, when executed, causes the computing device to collect the topology from the plurality of source tools.

In one general aspect, the techniques described herein relate to a system to connect information technology (IT) tools to provide a unified view of an IT system, the system including: at least one processor; and a non-transitory computer-readable medium including instructions that, when executed by the at least one processor, cause the system to: store topology from each of a plurality of source tools as a plurality of source subgraphs in a graph database using a source schema that mirrors a source topology model for each of the plurality of source tools; transform each of the plurality of source subgraphs in the graph database to a plurality of destination subgraphs using a destination schema and transformation rules that mirror a destination topology model for each of a plurality of destination tools; store the plurality of destination subgraphs in the graph database; and deliver the topology to each of the plurality of destination tools by traversing the plurality of destination subgraphs in the graph database and invoking application programming interfaces (APIs) for each of the plurality of destination tools in the destination subgraphs in the graph database.

In some aspects, the techniques described herein relate to a system, where instructions that, when executed by the at least one processor, cause the system to traverse each of the plurality of source subgraphs in a pattern consistent with a structure of each of the plurality of destination subgraphs.

In some aspects, the techniques described herein relate to a system, further including instructions that, when executed by the at least one processor, cause the system to expose the transformation rules to enable modification of the transformation rules via a user interface (UI).

In some aspects, the techniques described herein relate to a system, where the transformation rules include separate transformation rules defined for a combination of each of the plurality of source subgraphs being transformed to each of the plurality of destination subgraphs.

In some aspects, the techniques described herein relate to a system, further including instructions that, when executed by the at least one processor, cause the system to generate and output a graph visualization of the topology for each of the plurality of destination tools.

In some aspects, the techniques described herein relate to a system, further including instructions that, when executed by the at least one processor, cause the system to generate edges between each of the plurality of source subgraphs and each of the plurality of destination subgraphs.

In some aspects, the techniques described herein relate to a system, further including instructions that, when executed by the at least one processor, cause the system to generate and output a separate graph visualization for each of the plurality of source subgraphs transformed to each of the plurality of destination subgraphs including the edges between each of the plurality of source subgraphs and each of the plurality of destination subgraphs.

In some aspects, the techniques described herein relate to a system, further including instructions that, when executed by the at least one processor, cause the system to collect the topology from the plurality of source tools.

The details of one or more implementations are set forth in the accompanying drawings and the description below. Other features will be apparent from the description and drawings, and from the claims.

DETAILED DESCRIPTION

The present disclosure relates to systems and methods that simplify the work involved in connecting multiple monitoring tools together to help provide a single unified view of an organization's IT systems and how the components of the systems interoperate and relate to one another. The disclosed systems and methods can make possible the job of connecting complex IT systems together in a matter of hours. This task could otherwise take months or years even with expertise in software development and tools that most IT organizations do not even have on hand in their operations teams.

Figure 2:
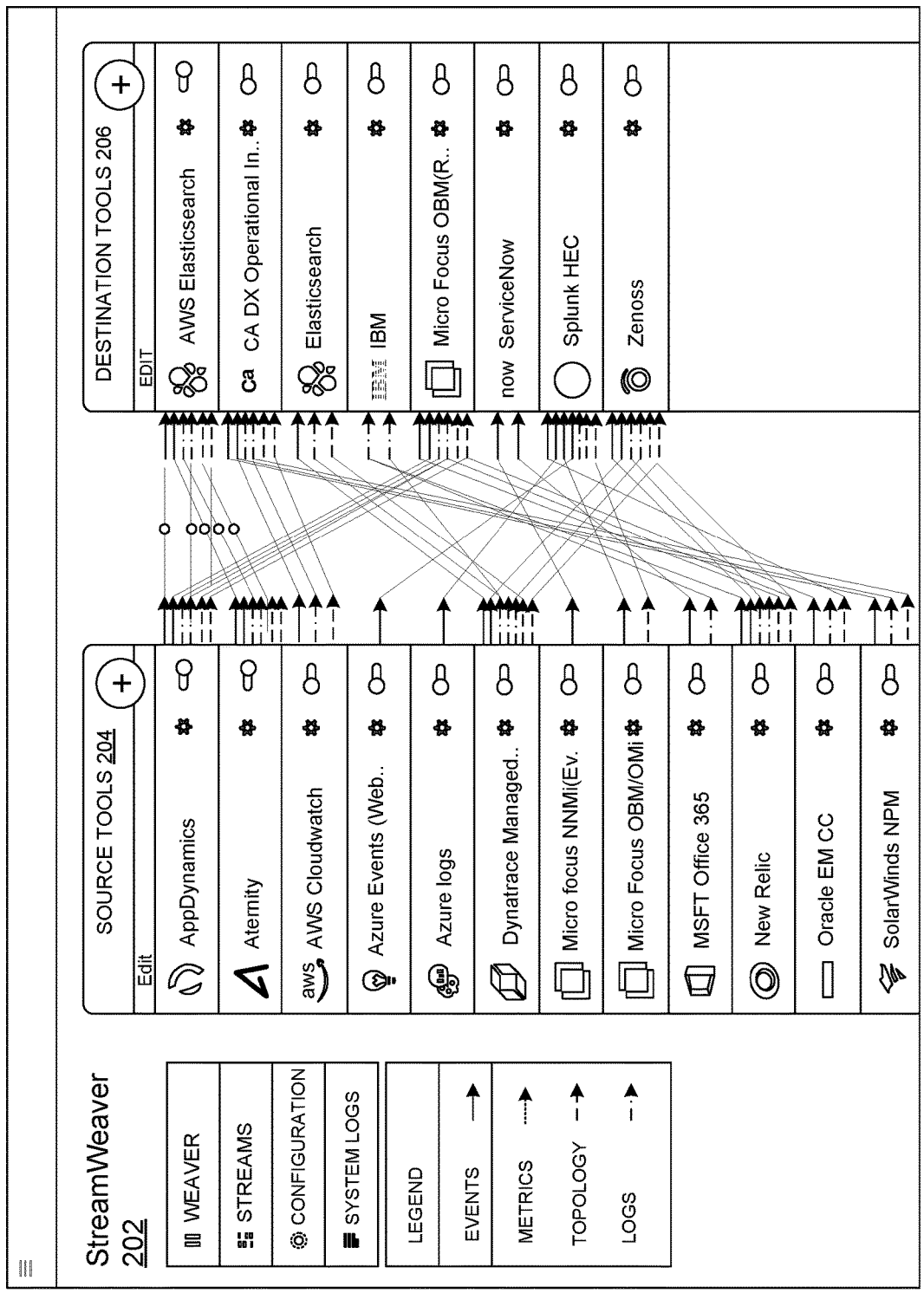
FIG. 2 illustrates a system using transformation technology from source tools to destination tools.
Figure 3:
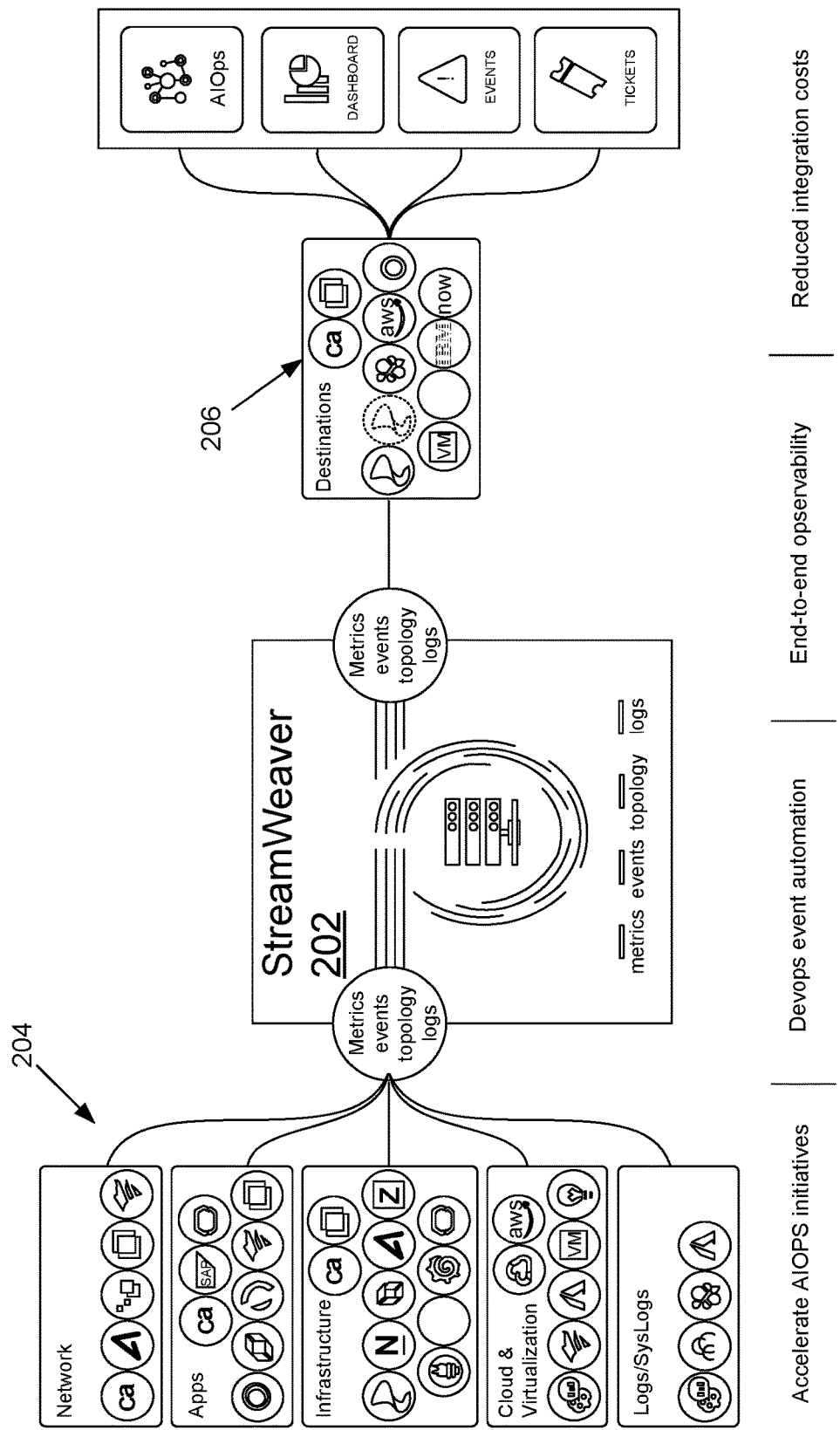
FIG. 3 illustrates a high-level graphic example of how data flows using transformation technology in an IT system.

FIG. 2 graphically illustrates a system for using transformation technology to transform a topology from a source tool to a topology of one or more destination tools. The systems and methods can include transformation technology of StreamWeaver Technologies, Inc. ("StreamWeaver") that addresses the problem of integrating a wide variety of data source tools with destination tools in IT systems. FIG. 3 illustrates a high level graphic example of how data flows using the transformation technology in a configured IT system. FIGS. 2 and 3 are discussed together below.

Figure 1:
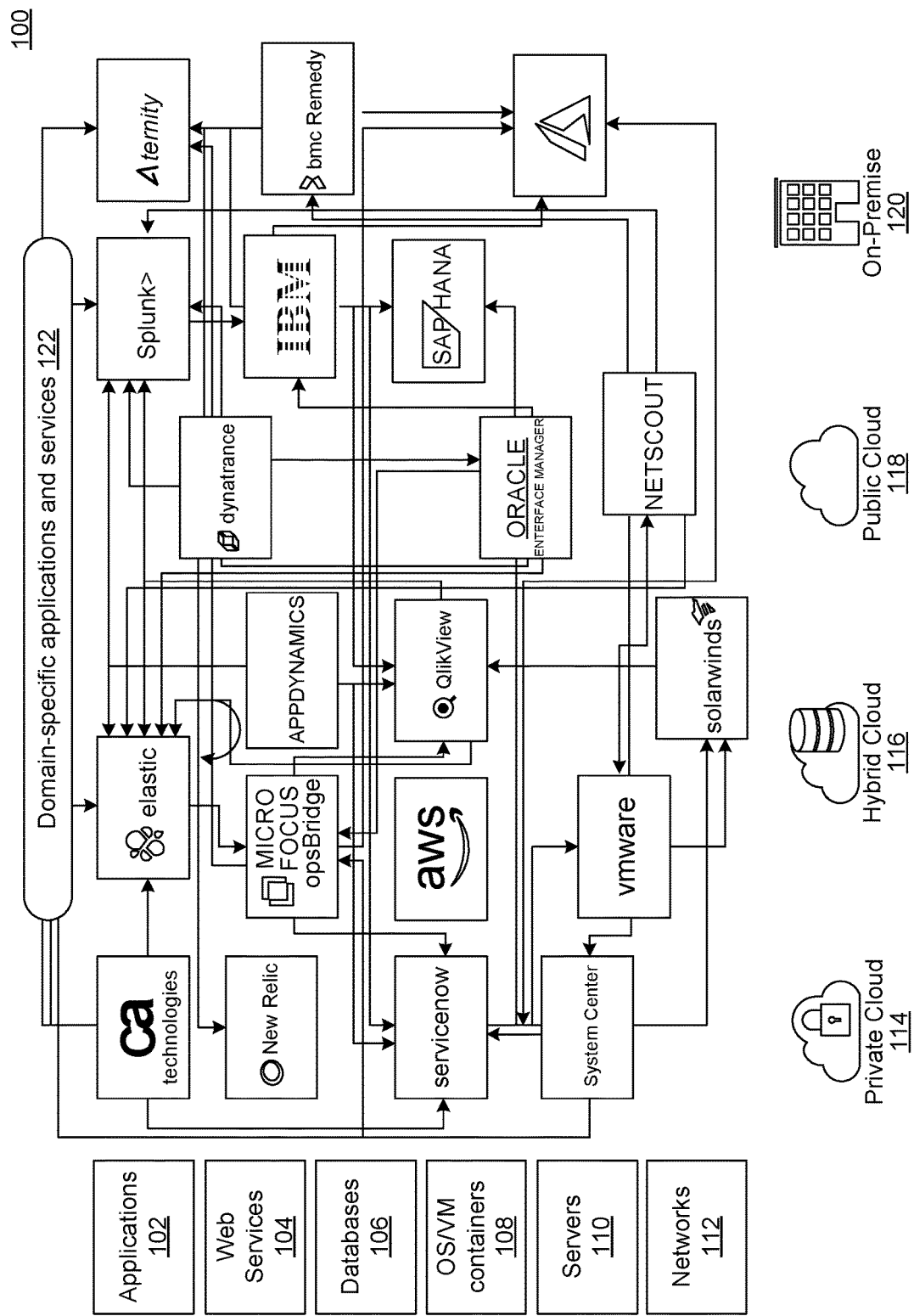
FIG. 1 illustrates an example block diagram of a complex information technology (IT) system.

There are a number of tools that organizations are using for managing their IT environments: service management (SM) tools for ticketing; event management tools for monitoring systems in the organization's environment and helping to determine root cause when problems occur; and dashboard tools that provide a view of the organization's overall IT environment. The tools can also include executive dashboards that provide a unified view of statistics and information about business units or problem applications. Organizations are also adopting artificial intelligence operations (ops) solutions and algorithmic ops solutions. These systems are capable of analyzing large volumes of metrics, events, and other data, in order to pinpoint root causes of issues or outages more quickly than a human could. This is necessary nowadays due to the complexity of the IT environments that organizations are running right now as shown in FIG. 1.

The StreamWeaver technology 202 gets events, incidents, metrics, and topology relationships from multiple source tools 204 (e.g., shown on the left side of FIG. 3) and delivers them accurately and rapidly to one or more destination tools 206 (e.g. shown on the right side of FIG. 3). The systems and methods disclosed herein enable integrations from source tool to destination tool without requiring knowledge of application program interfaces of each application. Instead, integrations can be configured using only the applications' connectivity details (e.g. address, port, and credentials).

Figure 4:
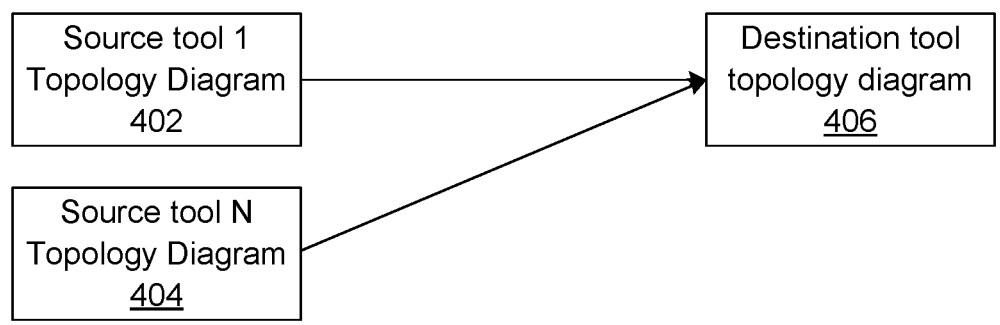
FIG. 4 is an example block diagram that relates to topology in IT systems.

FIG. 4 is a graphic that relates to topology in IT systems. Topology is the description of every "thing" that is being monitored and the relationship between the "things". Examples of "things" can include an application, an application instance, a virtual machine, a server, a database, a network interface, and a business transaction. Examples of relationships can include, application "HAS" application instance, application instance "RUNS-ON" virtual machine, application "PROVIDES" business transaction, virtual machine "HOSTED-BY" server, and virtual machine "HAS" network interface. Topology provides the context for monitoring data (events, incidents, metrics). One example context for monitoring data is "CPU Utilization for Server XYZ."

Different source tools may be monitoring different aspects of the same "thing" and it is desirable that the topology from each of these source tools map to the same "thing" in the destination tool topology even though each of the source tools may describe or model them differently. Specifically, both source tool 1 topology diagram 402 and source tool N topology diagram 404 should map to the destination tool topology diagram 406. In addition to acquiring, transforming, and delivering topology from a variety of source tools to destination tools, it is also desirable to document the provenance of each thing and relationship from source to destination.

Figure 5:
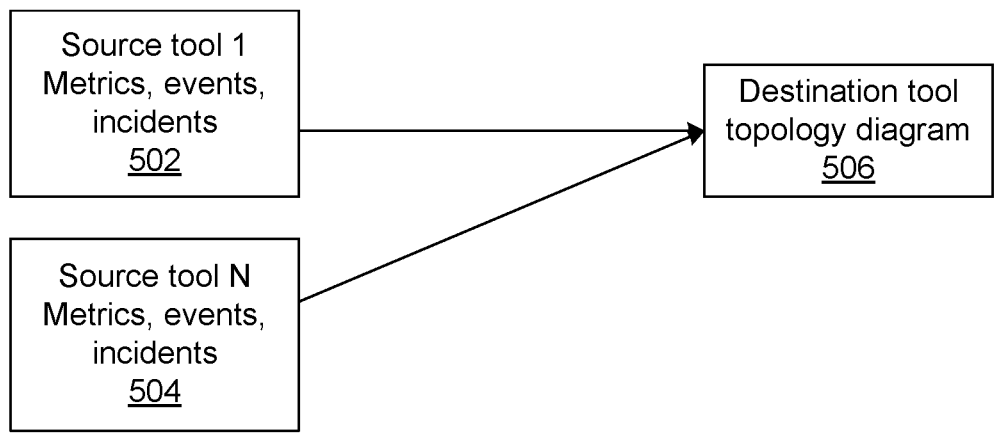
FIG. 5 is an example block diagram that relates to metrics, events, and incidents in IT systems.

FIG. 5 is a graphic that relates to metrics, events, and incidents in IT systems. It is desirable to transfer metrics, events, and incidents from various source tools to a destination tool with as much fidelity as possible. That is, it is desirable that the metrics, events, and incidents are associated with the correct "thing;" that the events and alerts are associated with the correct metric; and that the source tool codes (e.g., event status, event severity) are mapped as closely as possible to destination tool codes. In this manner, source tool 1 metrics, events, and incidents 502 and source tool N metrics, events, and incidents 504 should map to the destination tool topology diagram 506. Thus, while maintaining fidelity in transfer and transformation is desirable, it is also desirable to conform to the destination tool's model and conventions for monitoring data (metrics, events, and incidents) including, for example, metric names, categories, groups, and the topology context.

Figure 6:
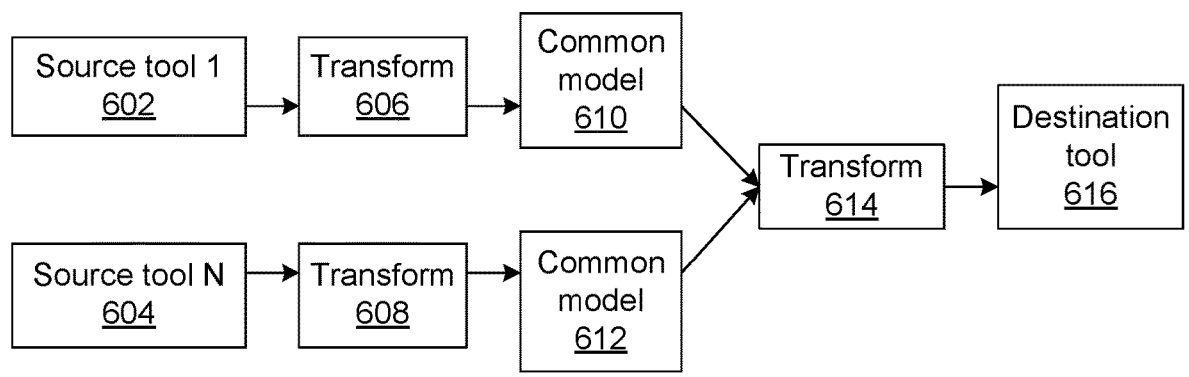
FIG. 6 is an example block diagram that relates to a legacy or conventional approach of using a common or intermediate model for streaming data in IT systems.

FIG. 6 is a graphic that relates to a legacy or conventional approach of using a common or intermediate model for streaming data in IT systems. A common approach in the industry for transferring data from source tools to destination tools is to use a common model, as an intermediate for transformation. With this approach, data is collected from a source tool (e.g., source tool 1 602 or source tool N 604), transform 606 and 608 it into the common model 610 and 612, transform 614 it into the destination model, and then deliver it to the destination tool 616. This approach seems ideal in that transformation rules need only be provided for each source tool and destination tool in isolation rather than for each combination of source tool to destination tool. However, in many cases, it results in a lossy translation (such as happens when translating from Spanish to Italian via English). Alternatively, the model has to be enhanced to handle every new case. Accepting a lossy transformation is contrary to the goal of high-fidelity and makes documenting provenance difficult. Evolving the common model can be expensive both in terms of effort and in time to market.

Figure 7:
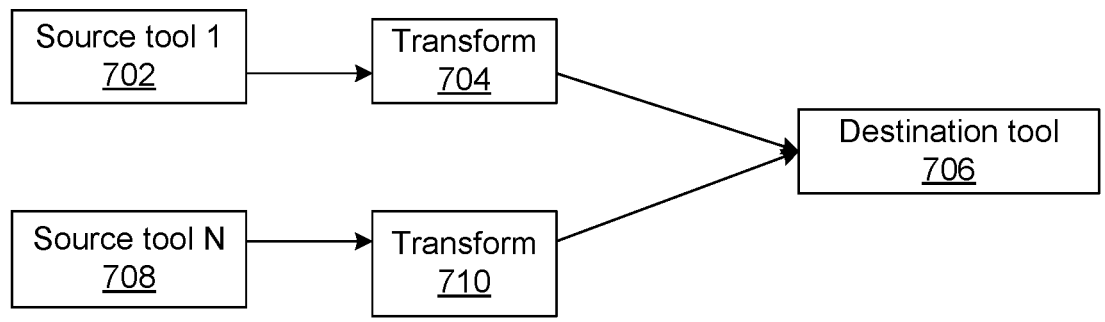
FIG. 7 is an example block diagram that relates to just-in-time transformation in streaming data in IT systems.

FIG. 7 is a graphic that relates to just-in-time transformation in streaming data in IT systems. An approach that avoids the issues of translating via a common model is to transform directly from source tool into the destination tool. Thus, source tool 1 702 is transformed 704 into the destination tool 706 and source tool N 708 is transformed 710 into the destination tool 706. In this approach, topology is collected from the source tool and delivered to a transformer that is specific to the source tool and destination tool pairing. This approach provides high-fidelity integration and simplifies documentation of provenance.

Figure 8:
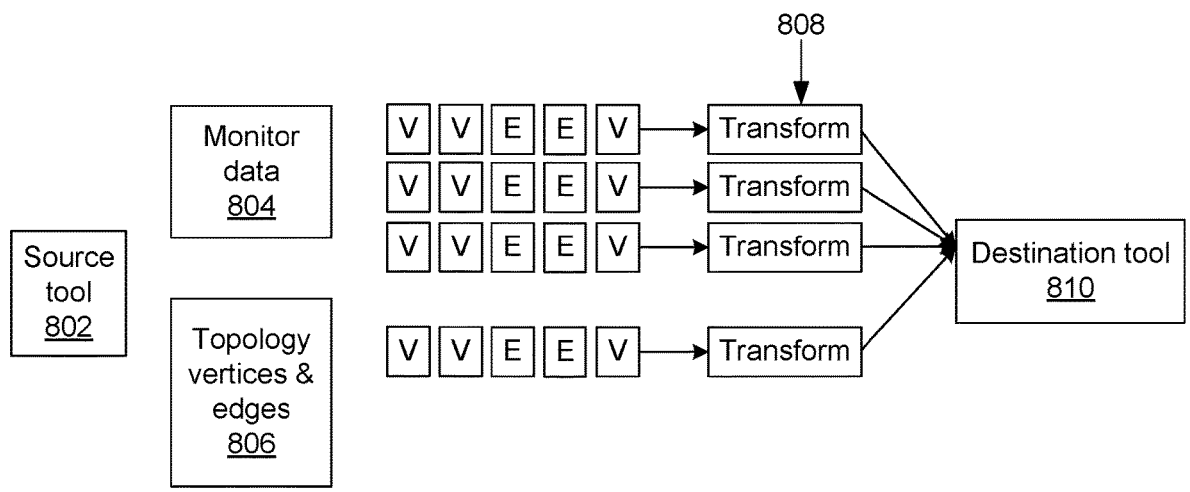
FIG. 8 is an example block diagram that relates to a streaming solution for delivering both monitoring data and topology from source systems to destination systems.

FIG. 8 is a graphic that relates to a streaming solution for delivering both monitoring data and topology from source systems to destination systems. Streaming of metrics, events, and incidents works well and is a common approach in the industry. Transforming as the last stage of the stream is a natural implementation of the just-in-time-transformation approach outlined earlier in FIG. 7. Streaming of topology requires transmitting each vertex (thing) and edge (relationship) of the topology graph. Transforming as the last stage of the stream is consistent with the just-in-time-transformation approach of FIG. 7. Thus, the source tool 802 monitors data 804 and the topology vertices and edges 806 and transmits each vertex and each edge (e.g., Vs and Es on FIG. 8) to be transformed 808 to the destination tool 810. However, transforming a graph by processing discrete vertices and edges is complicated and sometime requires re-assembling the graph prior to transformation.

Figure 9A:
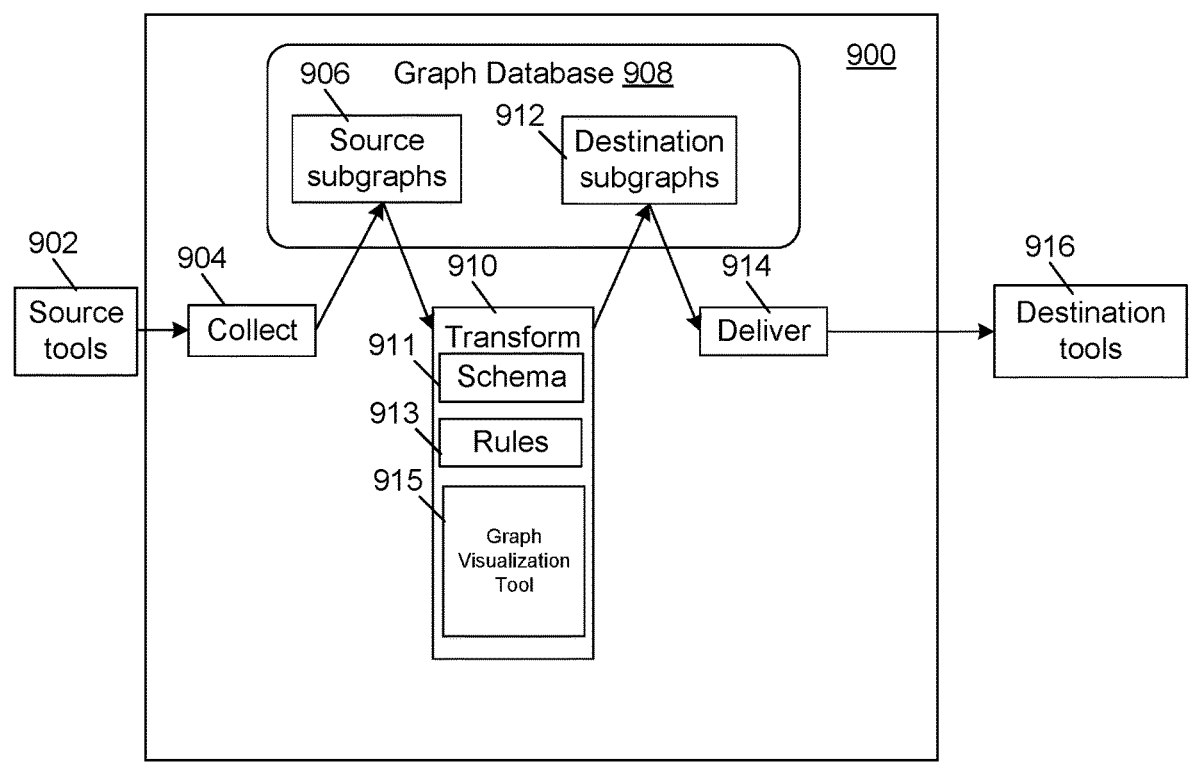
FIG. 9A illustrates a system and corresponding method of using a graph database to delivery topology from source tools to destination tools.

FIG. 9A illustrates a system 900 and corresponding method of using a graph database to deliver topology from source tools 902 to destination tools 916. The system 900 includes a collect module 904, a graph database 908, a transform module 910, and a deliver module 914. In accordance with one implementation, the system 900 implements a method that proceeds as follows. The collect module 904 collects topology from multiple source tools 902. The collect module 904 may use APIs related to the source tools 902 to collect the topology and then save the topology to a graph database 908 that uses a schema that mirrors the source-tool topology model. The collect module 904 saves each topology collected from a single source tool as a source subgraph 906 in the graph database 908. In this manner, each collected topology is saved as a separate source subgraph 906.

The transform module 910 transforms each of the source subgraphs 906 to one or more destination subgraphs 912. That is, a single source subgraph 906 may be transformed to many different destination subgraphs 912. For the transformation, the transform module 910 uses a schema 911 that mirrors the destination-tool's topology model. The transform module 910 can use graph queries to navigate the source subgraph 906 in a manner that is consistent with the structure of the destination subgraph 912. The transform module 910 also may use transformation rules to transform the source subgraph 906 into multiple destination subgraphs 912. For each transformation of a single source subgraph 906 to multiple destination subgraphs 912, a separate schema 911 and separate transformation rules 913 are used that are specific to each destination subgraph 912. In this manner, a single source subgraph 906 is normalized into multiple, different destination subgraphs 912.

The transform module 910 is capable of recognizing multiple source subgraphs 906 that have been collected from the same host and normalizing the source subgraphs 906 into single destination subgraph 912. That way, two topologies that have been presenting as two different topologies, but in reality, are only a single topology, get transformed as a single topology to each of the destination subgraphs 912.

Transformation rules are exposed in a manner that they can be defined and/or modified by a subject-matter-expert (SME) and do not require deep programming skills. Transformation rules 913 are defined for each combination of source-system to destination-system. A transformation module 910 can use graph queries to enrich monitoring data (metrics, events, incidents) if needed. Enrichment rules can be provided in a form that is accessible by SMEs.

The transform module 910 may be configured to generate and output a graphical visualization of the topology for each of the destination tools 916. The graph visualization tool 915 aids transformation rule development and production troubleshooting, especially for destination tools 916 with poor or non-existent topology visualization. The transform module 910 also may generate edges between each of the source subgraphs 906 and each of the destination subgraphs 912. The transform module 910 may generate and output a separate graph visualization for each of the source subgraphs 906 that have been transformed to each of the destination subgraphs 912 including, graphing the edges to provide provenance.

The deliver module 914 is configured to deliver the topology to each of the destination tools 916 by navigating the destination subgraphs 912 in the graph database 908 and invoking APIs for the destination tools 916. The deliver module 914 may be triggered to deliver the topology to the destination tools 916 periodically or upon completion of source tool collection and transformation.

Figure 9B:
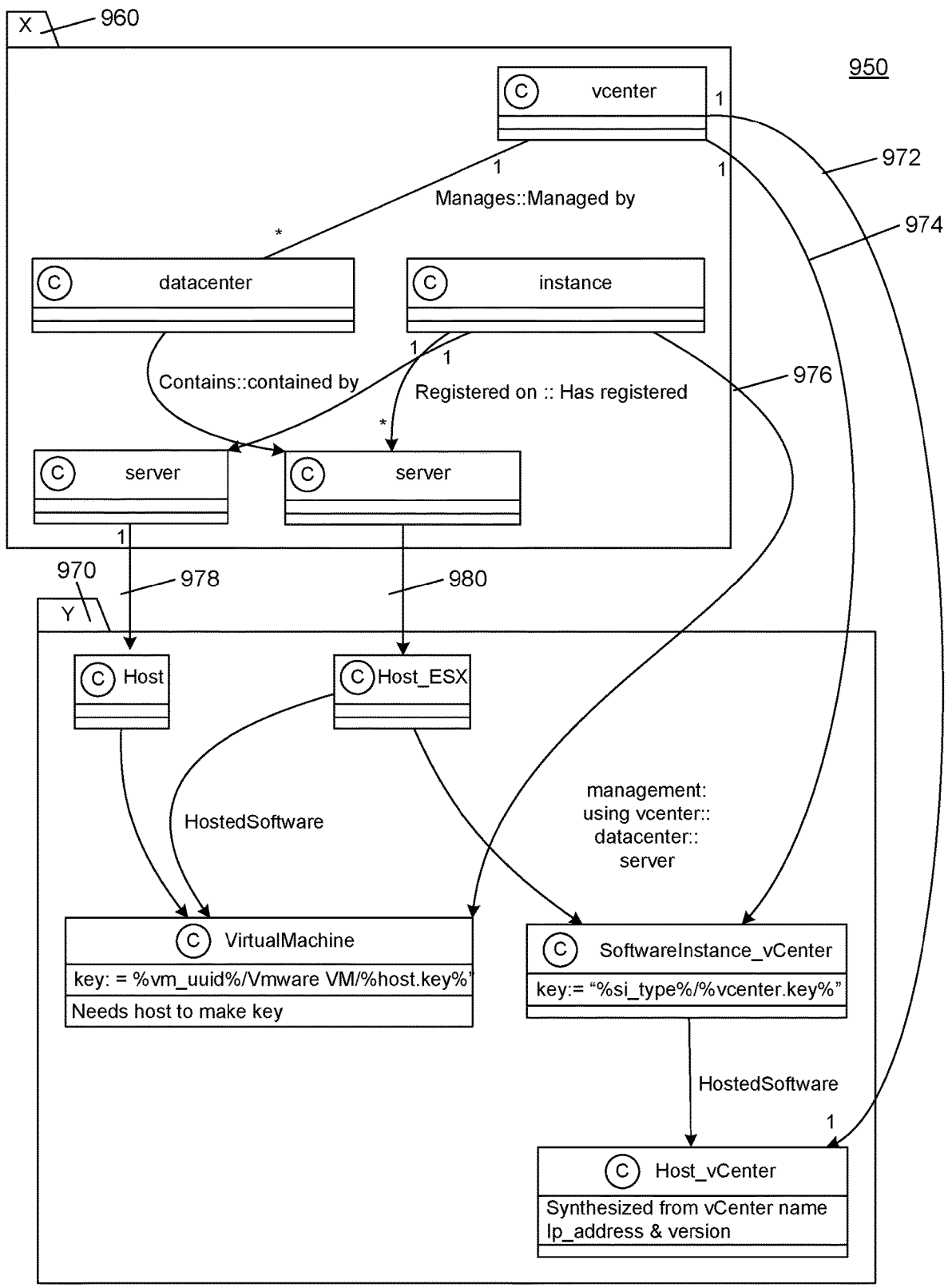
FIG. 9B illustrates an example block diagram of a graph visualization of a topology from a source tool "X" to a destination tool "Y" including the edges to provide provenance.

FIG. 9B illustrates an example block diagram of a graph visualization 950 of a topology from a source tool "X" 960 to a destination tool "Y" 970 including the edges to provide provenance. In this example, the topology from the source tool "X" 960 has been collected by the collect module 904, stored as a source subgraph 906 in the graph database 908, and transformed to a destination subgraph 912 by the transform module 910. The transform module 910 has applied the schema 911 and transformation rules 913 specific to the destination tool "Y" 970. The transform module 910 stores the destination subgraph 912 in the graph database 908. The transform module 910 generates the graph visualization 950 that graphically illustrates the mapping between the topology of the source tool "X" 960 and the topology of the destination tool "Y" 970.

The transform module 910 of FIG. 9A also generates the edges 972, 974, 976, 978, and 980 to illustrate visually the mapping from the topology of the source tool "X" 960 to the destination tool "Y" 970 to provide provenance.

Figure 10:
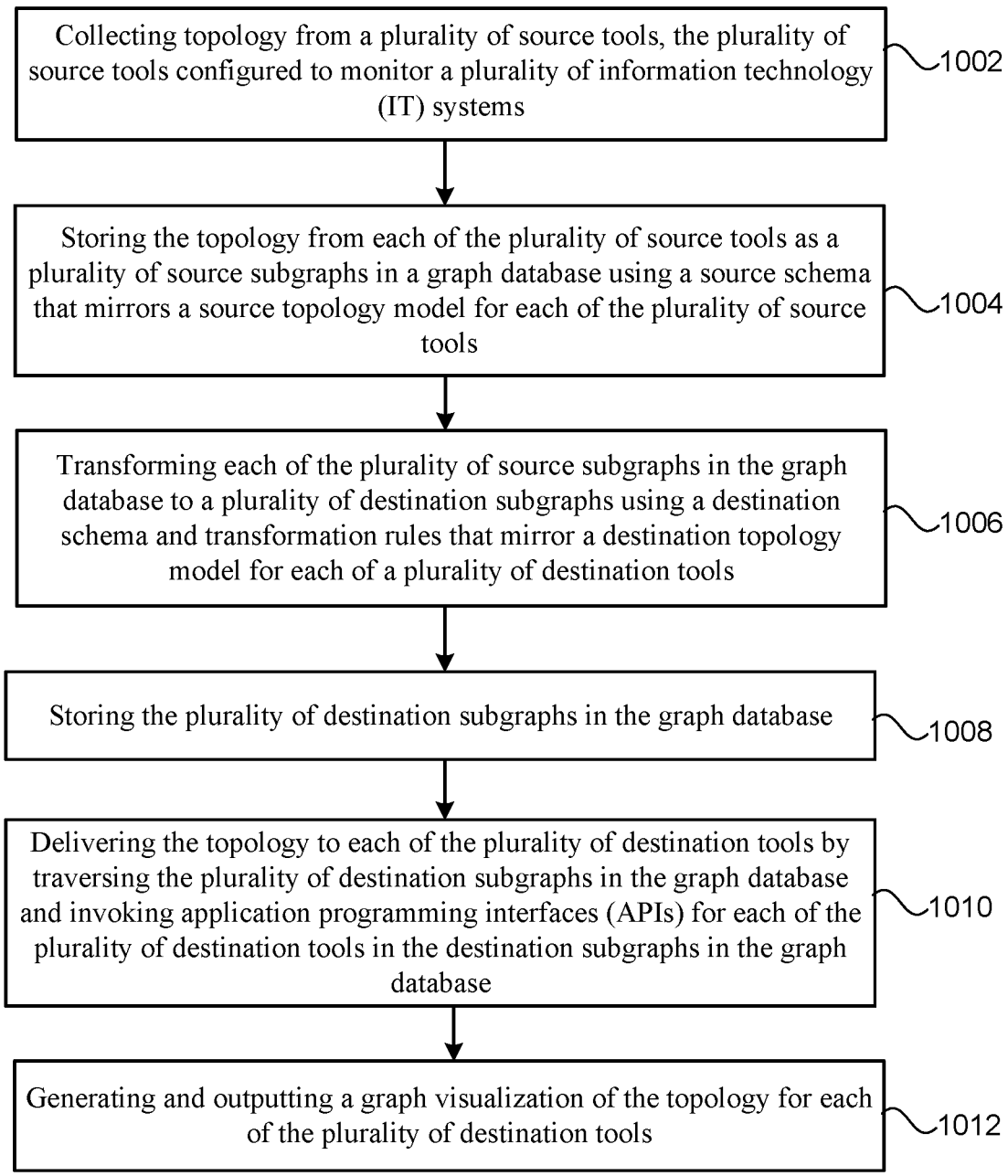
FIG. 10 is an example flowchart for a process 1000 illustrating example operations of the system 900 of FIG. 9A.

FIG. 10 is an example flowchart for a process 1000 illustrating example operations of the system 900 of FIG. 9A. More specifically, process 1000 illustrates an example computer-implemented method for transforming and delivering topology from multiple source tools 902 to multiple destination tools 916. In this manner, the topology from the source tool 902 may be transformed and delivered to multiple, different destination tools 916. In some implementations, process 1000 may be performed by the computer 1101 of FIG. 11. Instructions for the performance of process 1000 may be stored in the system memory 1104 and/or the local storage 1108 of FIG. 11, and the stored instructions may be executed by the processing unit(s) 1102 of FIG. 11. Process 1000 is also illustrative of a computer program product that may be implemented by the computer 1101 of FIG. 11.

Process 1000 includes collecting topology from a plurality of source tools, where the plurality of source tools is configured to monitor a plurality of information technology (IT) systems (1002). For example, the collect module 904 may be configured to collect topology from sources tools 902. As discussed above, the source tools 902 are configured to monitor multiple IT systems.

Process 1000 includes storing the topology from each of the plurality of source tools as a plurality of source subgraphs in a graph database using a source schema that mirrors a source topology model for each of the plurality of source tools (1004). For example, the collect module 904 stores the topology from each of the source tools 902 as source subgraphs 906 in the graph database 908 using a source schema that mirrors a source topology model for each of the source tools 902.

Process 1000 includes transforming each of the plurality of source subgraphs in the graph database to a plurality of destination subgraphs using a destination schema and transformation rules that mirror a destination topology model for each of a plurality of destination tools (1006). Transforming the source subgraphs may include using graph queries to navigate each of the source subgraphs in a pattern consistent with a structure of each of the destination subgraphs. For example, the transform module 910 is configured to transform each of the source subgraphs 906 in the graph database 908 to multiple destination subgraphs 912 using a destination schema 911 and transformation rules 913 that mirror the destination topology model for each of the destination tools 916. The transform module 910 may use graph queries to navigate each of the source subgraphs 906 in a pattern consistent with the structure of each of the destination subgraphs 912. Optionally, the transformation rules 913 may be exposed to enable modification of the transformation rules 913 via a user interface (UI). The transformation rules 913 may include separate transformation rules 913 defined for a combination of each of the source subgraphs 906 being transformed to each of the destination subgraphs 912.

Process 1000 includes storing the plurality of destination subgraphs in the graph database (1008). For example, the transform module 910 is configured to store the destination subgraphs 912 in the graph database 908.

Process 1000 includes delivering the topology to each of the plurality of destination tools by traversing (or navigating) the plurality of destination subgraphs in the graph database and invoking application programming interfaces (APIs) for each of the plurality of destination tools in the destination subgraphs in the graph database (1010). For example, the deliver module 914 is configured to deliver the topology to each of the destination tools 916 by traversing the destination subgraphs 912 in the graph database 908 and invoking APIs for the destination tools (916).

Process 1000 may optionally include generating and outputting a graph visualization of the topology for each of the plurality of destination tools (1012). For example, the transform module 910 may be configured to generate and output a graph visualization of the topology for each of the destination tools 916 using the graph visualization tool 915. The transform module 910 also may generate edges between each of the source subgraphs 906 and each of the destination subgraphs 912. The transform module 910 may generate and output a separate graph visualization for each of the source subgraphs 906 transformed to each of the destination subgraphs 912 including the graphing the edges to provide provenance.

Figure 11:
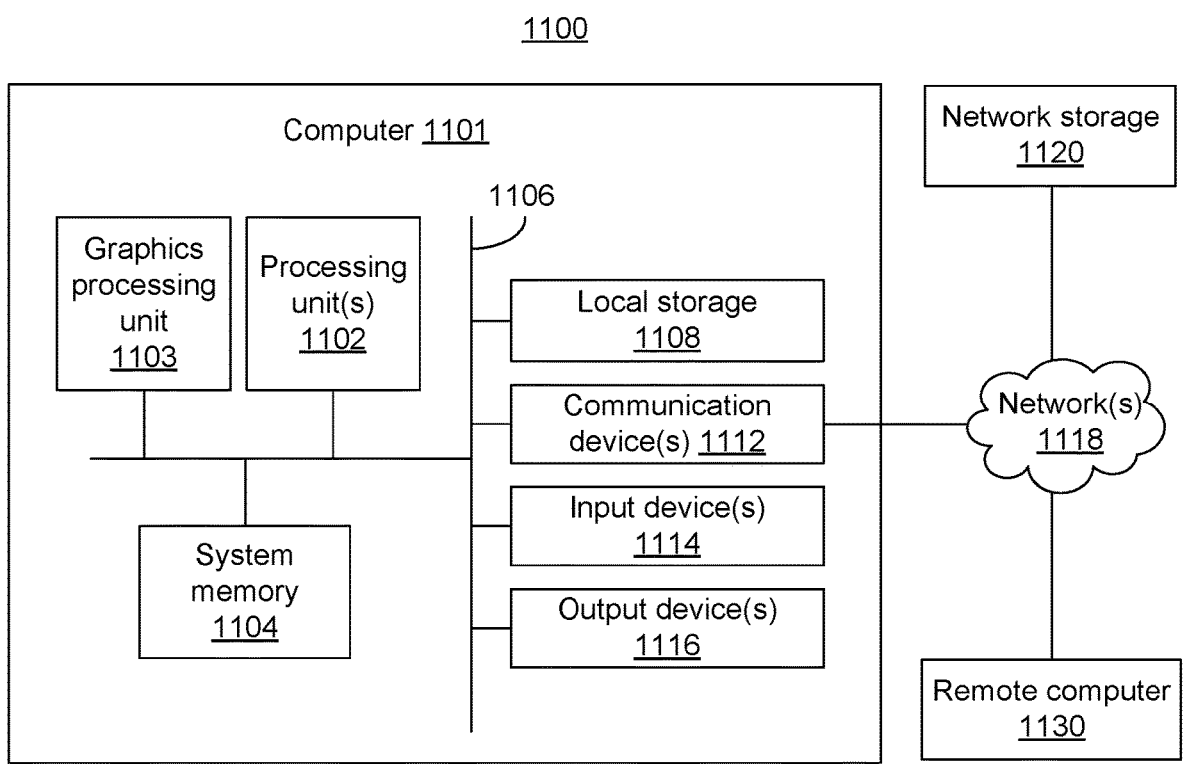
FIG. 11 illustrates a general computer architecture 1100 that can be appropriately configured to implement components disclosed in accordance with various implementations.

FIG. 11 is an example computer architecture 1100, including a computer 1101 with processing unit(s) 1102, a graphics processing unit 1103, and system memory 1104. System bus 1106 connects local storage 1108, communication device(s) 1112, input device(s) 1114, and output device(s) 1116 to a network(s) 1118, which has network storage 1120 and is connected to a remote computer 1130.

Components of the implementations disclosed herein, which may be referred to as methods, processes, applications, programs, modules, engines, functions or the like, can be implemented by configuring one or more such computers or computer systems 1101 using special purpose software embodied as instructions on a non-transitory computer readable medium. The one or more computers or computer systems 1101 can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system 1101. By way of example, any data created, used, or operated upon by the implementations disclosed herein can be stored in, accessed from, and/or modified in a database operating on a computer system 1101.

FIG. 11 illustrates a general computer architecture 1100 that can be appropriately configured to implement components disclosed in accordance with various implementations. The computing architecture 1100 can include various common computing elements, such as a computer 1101, a network 1118, and one or more remote computers 1130. The implementations disclosed herein, however, are not limited to the implementation illustrated by the general computing architecture 1100.

Referring to FIG. 11, the computer 1101 can be any of a variety of general-purpose computers such as, for example, a server, a desktop computer, a laptop computer, a tablet computer, a mobile computing device, a mainframe, a virtual machine, as well as other types of computing devices. The computer 1101 can include a processing unit(s) 1102 (also referred to interchangeably as at least one processor), a system memory 1104 (also referred to interchangeably as at least one memory), and a system bus 1106.

The processing unit(s) 1102 can be or include one or more of any of various commercially available computer processors, which can each include one or more processing cores that can operate independently of each other. Additional co-processing units, such as a graphics processing unit 1103, also can be present in the computer 1101.

The system memory 1104 can include volatile devices, such as dynamic random access memory (DRAM) or other random access memory devices. The system memory 1104 can also or alternatively include non-volatile devices, such as a read-only memory or flash memory. The system memory 1104 also may be referred to as a type of non-transitory, computer-readable storage medium.

The computer 1101 can include non-volatile local storage 1108 such as a disk drive, solid state disk, or removable memory card, also referred to as local non-volatile secondary storage. The local storage 1108 can include one or more removable and/or non-removable storage units. The local storage 1108 can be used to store an operating system that initiates and manages various applications that execute on the computer 1101. The local storage 1108 can also be used to store special purpose software configured to implement the components of the implementations disclosed herein and that can be executed as one or more applications under the operating system. The local storage 1108 also may be referred to as a type of non-transitory, computer-readable storage medium.

The computer 1101 can also include communication device(s) 1112 through which the computer communicates with other devices, such as one or more remote computers 1130, over wired and/or wireless computer network(s) 1118. Communications device(s) 1112 can include, for example, a network interface for communicating data over a wired computer network. The communication device(s) 1112 can include, for example, one or more radio transmitters for communications over Wi-Fi, Bluetooth, and/or mobile telephone networks.

The computer 1101 can also access network storage 1120 through the computer network(s) 1118. The network storage 1120 can include, for example, a network-attached storage device located on a local network, or cloud-based storage hosted at one or more remote data centers. The operating system and/or special purpose software can alternatively be stored in the network storage 1120.

The computer 1101 can have various input device(s) 1114 such as a keyboard, mouse, touchscreen, camera, microphone, accelerometer, thermometer, magnetometer, or any other sensor. Output device(s) 1116 such as a display, speakers, printer, or other type of output device can also be included.

The various local storage 1108, communication device(s) 1112, output device(s) 1116, and input device(s) 1114 can be integrated within a housing of the computer 1101, or can be connected through various input/output interface devices on the computer 1101, in which case the reference numbers 1108, 1112, 1114, and 1116 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, or the like, that, when processed by a processing unit, instruct the processing unit to perform operations on data or to configure the processor or computer to implement various components or data structures.

Components of the implementations disclosed herein, which may be referred to as modules, engines, processes, functions or the like, can be implemented in hardware, such as by using special purpose hardware logic components, by configuring general-purpose computing resources using special-purpose software, or by a combination of special-purpose hardware and configured general-purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

The above descriptions make reference to various implementations in accordance with which the disclosed subject matter can be practiced. Some implementations may be described using the expressions one/an/another implementation or the like, multiple instances of which do not necessarily refer to the same implementation. Particular features, structures, or characteristics associated with such instances can be combined in any suitable manner in various implementations unless otherwise noted. By way of example, this disclosure may set out a set or list of a number of options or possibilities for an implementation, and in such case, this disclosure specifically contemplates all clearly feasible combinations and/or permutations of items in the set or list.

A portion of the disclosure of this patent document contains material that may be subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations.

What is claimed is:

1. A computer-implemented method, the computer-implemented method to connect information technology (IT) tools to provide a unified view of an IT system, the computer-implemented method comprising:
    storing, using a processing unit, topology from each of a plurality of source tools as a plurality of source subgraphs in a graph database using a source schema that mirrors a source topology model for each of the plurality of source tools;
    transforming, using the processing unit, each of the plurality of source subgraphs in the graph database to a plurality of destination subgraphs using a destination schema and transformation rules that mirror a destination topology model for each of a plurality of destination tools;
    storing, using the processing unit, the plurality of destination subgraphs in the graph database;
    delivering, using the processing unit, the topology to each of the plurality of destination tools by traversing the plurality of destination subgraphs in the graph database and invoking application programming interfaces (APIs) for each of the plurality of destination tools in the destination subgraphs in the graph database; and
    generating and outputting, using the processing unit, a graph visualization of the topology for each of the plurality of destination tools to provide the unified view of the IT system.

2. The computer-implemented method as in claim 1, wherein transforming each of the plurality of source subgraphs comprises using graph queries to traverse each of the plurality of source subgraphs in a pattern consistent with a structure of each of the plurality of destination subgraphs.

3. The computer-implemented method as in claim 1, further comprising exposing, using the processing unit, the transformation rules to enable modification of the transformation rules via a user interface (UI).

4. The computer-implemented method as in claim 1, wherein the transformation rules include separate transformation rules defined for a combination of each of the plurality of source subgraphs being transformed to each of the plurality of destination subgraphs.

5. The computer-implemented method as in claim 1, further comprising generating, using the processing unit, edges between each of the plurality of source subgraphs and each of the plurality of destination subgraphs.

6. The computer-implemented method as in claim 5, further comprising generating and outputting, using the processing unit, a separate graph visualization for each of the plurality of source subgraphs transformed to each of the plurality of destination subgraphs including the edges between each of the plurality of source subgraphs and each of the plurality of destination subgraphs.

7. The computer-implemented method as in claim 1, further comprising collecting, using the processing unit, the topology from the plurality of source tools.

8. A computer program product to connect information technology (IT) tools to provide a unified view of an IT system, the computer program product being tangibly embodied on a non-transitory computer-readable medium and including executable code that, when executed, is configured to cause a computing device to:
    store topology from each of a plurality of source tools as a plurality of source subgraphs in a graph database using a source schema that mirrors a source topology model for each of the plurality of source tools;
    transform each of the plurality of source subgraphs in the graph database to a plurality of destination subgraphs using a destination schema and transformation rules that mirror a destination topology model for each of a plurality of destination tools;
    store the plurality of destination subgraphs in the graph database;
    deliver the topology to each of the plurality of destination tools by traversing the plurality of destination subgraphs in the graph database and invoking application programming interfaces (APIs) for each of the plurality of destination tools in the destination subgraphs in the graph database; and
    generate and output a graph visualization of the topology for each of the plurality of destination tools to provide the unified view of the IT system.

9. The computer program product of claim 8, wherein the executable code that, when executed, causes the computing device to use graph queries to traverse each of the plurality of source subgraphs in a pattern consistent with a structure of each of the plurality of destination subgraphs.

10. The computer program product of claim 8, further comprising executable code that, when executed, causes the computing device to expose the transformation rules to enable modification of the transformation rules via a user interface (UI).

11. The computer program product of claim 8, wherein the transformation rules include separate transformation rules defined for a combination of each of the plurality of source subgraphs being transformed to each of the plurality of destination subgraphs.

12. The computer program product of claim 8, further comprising executable code that, when executed, causes the computing device to generate edges between each of the plurality of source subgraphs and each of the plurality of destination subgraphs.

13. The computer program product of claim 12, further comprising executable code that, when executed, causes the computing device to generate and output a separate graph visualization for each of the plurality of source subgraphs transformed to each of the plurality of destination subgraphs including the edges between each of the plurality of source subgraphs and each of the plurality of destination subgraphs.

14. The computer program product of claim 8, further comprising executable code that, when executed, causes the computing device to collect the topology from the plurality of source tools.

15. A system to connect information technology (IT) tools to provide a unified view of an IT system, the system comprising:
at least one processor; and
a non-transitory computer-readable medium comprising instructions that, when executed by the at least one processor, cause the system to:
store topology from each of a plurality of source tools as a plurality of source subgraphs in a graph database using a source schema that mirrors a source topology model for each of the plurality of source tools;
transform each of the plurality of source subgraphs in the graph database to a plurality of destination subgraphs using a destination schema and transformation rules that mirror a destination topology model for each of a plurality of destination tools;
store the plurality of destination subgraphs in the graph database;
deliver the topology to each of the plurality of destination tools by traversing the plurality of destination subgraphs in the graph database and invoking application programming interfaces (APIs) for each of the plurality of destination tools in the destination subgraphs in the graph database; and
generate and output a graph visualization of the topology for each of the plurality of destination tools to provide the unified view of the IT system.

16. The system of claim 15, wherein instructions that, when executed by the at least one processor, cause the system to traverse each of the plurality of source subgraphs in a pattern consistent with a structure of each of the plurality of destination subgraphs.

17. The system of claim 15, further comprising instructions that, when executed by the at least one processor, cause the system to expose the transformation rules to enable modification of the transformation rules via a user interface (UI).

18. The system of claim 15, wherein the transformation rules include separate transformation rules defined for a combination of each of the plurality of source subgraphs being transformed to each of the plurality of destination subgraphs.

19. The system of claim 15, further comprising instructions that, when executed by the at least one processor, cause the system to generate edges between each of the plurality of source subgraphs and each of the plurality of destination subgraphs.

20. The system of claim 19, further comprising instructions that, when executed by the at least one processor, cause the system to generate and output a separate graph visualization for each of the plurality of source subgraphs transformed to each of the plurality of destination subgraphs including the edges between each of the plurality of source subgraphs and each of the plurality of destination subgraphs.

21. The system of claim 15, further comprising instructions that, when executed by the at least one processor, cause the system to collect the topology from the plurality of source tools.

* * * * *